US008225351B2

(12) United States Patent
Jo et al.

(10) Patent No.: US 8,225,351 B2

(45) Date of Patent: Jul. 17, 2012

(54) MOBILE TERMINAL, AND BROADCAST CHANNEL AND BROADCAST INFORMATION INDICATION METHOD THEREOF

(75) Inventors: Young-Sub Jo, Gyeonggi-Do (KR); Won-Jong Lee, Gyeonggi-Do (KR); Tae-Jung Kwon, Seoul (KR)

(73) Assignee: LG Electronics Inc., Seoul (KR)

( * ) Notice: Subject to any disclaimer, the term of this patent is extended or adjusted under 35 U.S.C. 154(b) by 381 days.

(21) Appl. No.: 12/172,166

(22) Filed: Jul. 11, 2008

(65) Prior Publication Data

US 2009/0019484 A1 Jan. 15, 2009

(30) Foreign Application Priority Data

Jul. 12, 2007 (KR) ........................ 10-2007-0070287

(51) Int. Cl.
*H04N 5/445* (2011.01)
*H04N 7/16* (2011.01)

(52) U.S. Cl. ............ 725/40; 725/62; 725/133; 725/141; 725/153

(58) Field of Classification Search .................... 725/62, 725/69, 133, 141, 153; 455/404.1, 414.1, 455/414.3
See application file for complete search history.

(56) References Cited

U.S. PATENT DOCUMENTS

| | | | | |
|---|---|---|---|---|
| 6,215,483 | B1 | 4/2001 | Zigmond | |
| 7,116,972 | B1 * | 10/2006 | Zhang et al. | 455/414.1 |
| 7,561,214 | B1 * | 7/2009 | O'Callaghan | 348/731 |
| 2002/0022476 | A1 * | 2/2002 | Go | 455/414 |
| 2003/0096625 | A1 * | 5/2003 | Lee et al. | 455/466 |
| 2005/0197096 | A1 * | 9/2005 | Yang et al. | 455/404.1 |
| 2006/0294558 | A1 * | 12/2006 | Morris et al. | 725/89 |
| 2007/0107018 | A1 * | 5/2007 | Song et al. | 725/69 |
| 2007/0288956 | A1 * | 12/2007 | Bang | 725/38 |

FOREIGN PATENT DOCUMENTS

| | | |
|---|---|---|
| EP | 1655867 | 5/2006 |

* cited by examiner

*Primary Examiner* — Kieu Oanh T Bui

(74) *Attorney, Agent, or Firm* — Lee, Hong, Degerman, Kang & Waimey

(57) ABSTRACT

A method for displaying broadcast channel information in a mobile terminal is presented. The method includes entering a broadcast reception mode, and displaying channel information indicating whether each channel available for reception is a general channel or an integrated channel, wherein a general channel comprises one broadcast channel mapped onto a single broadcast path, and an integrated channel comprises at least two virtual channels mapped onto a single broadcast path.

12 Claims, 9 Drawing Sheets

MOBILE TERMINAL, AND BROADCAST CHANNEL AND BROADCAST INFORMATION INDICATION METHOD THEREOF

CROSS-REFERENCE TO RELATED APPLICATIONS

Pursuant to 35 U.S.C. §119(a), this application claims the benefit of earlier filing date and right of priority to Korean Application No. 10-2007-0070287, filed on Jul. 12, 2007, the contents of which are hereby incorporated by reference herein in its entirety

BACKGROUND OF THE INVENTION

1. Field of the Invention

The present invention relates to a mobile terminal which receives digital channels, and a method for indicating channel and broadcast information when the number of digital broadcast channels provided for reception by mobile terminals is greater than the number of digital broadcast channels that may be provided via the broadcast path.

2. Discussion of the Related Art

Generally, the number of broadcast channels that may be provided at any one time is limited by the available bandwidth of a broadcast path. As such, broadcast or communication providers attempt to provide a greater number of broadcast channels than the number of available broadcast channels. The number of available channels may be limited by the bandwidth of the available broadcast path.

Prior art mobile terminals are not capable of providing information regarding a virtual broadcast channel when the number of broadcast channels that are provided is greater than the number of broadcast channels that may be provided via a broadcast path.

Further, prior art methods are not capable of mapping a plurality of broadcast channels on one broadcast path and setting a time when each of the plurality of broadcast channels may use the broadcast path. Additionally, prior art mobile terminals are not capable of providing channel information to a user, wherein the channel information changes when a single broadcast path is shared by multiple broadcast channels according to time periods or units of time.

Finally, prior art mobile terminals are not capable of providing a previously viewed broadcast channel via a different broadcast path when a broadcast channel on one broadcast path is changed according to broadcast time information.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In accordance with an embodiment, a method for displaying broadcast channel information in a mobile terminal is presented. The method includes entering a broadcast reception mode, and displaying channel information indicating whether each channel available for reception is a general channel or an integrated channel, wherein a general channel comprises one broadcast channel mapped onto a single broadcast path, and an integrated channel comprises at least two virtual channels mapped onto a single broadcast path.

In one feature, the broadcast path is divided by frequencies or by time slots. Additionally, the integrated channel further includes one broadcast channel for reception of broadcast signals at a specified time and at least one virtual broadcast channel not available for the reception of broadcast signals at the specified time. The virtual broadcast channels are identified by information including broadcast paths and broadcast time slot of each channel.

In accordance with another embodiment, a method for displaying broadcast channel information in a mobile terminal is presented. The method includes entering a broadcast reception mode, and displaying channel information for whether each channel available for reception of a broadcast signal is a general channel or a virtual channel, wherein a general channel comprises one broadcast channel mapped onto a single broadcast path, and an integrated channel comprises at least two virtual channels mapped onto a single broadcast path.

In accordance with yet another embodiment, a method for displaying broadcast channel information is presented, the method includes entering a broadcast reception mode, and displaying channel information indicating whether each channel is viewable according to broadcasting time slot information for each channel.

In accordance with still yet another embodiment, a method for displaying information of receivable broadcasting in a mobile terminal is presented. The method includes entering a broadcast mode, receiving and outputting a broadcast carried on a selected broadcast channel, determining the occurrence of a broadcast termination according to broadcasting time slot information of the selected broadcast channel, and outputting a message related to termination of broadcasting after a specific time elapses.

In accordance with another embodiment, a mobile terminal is presented. The mobile terminal includes a receiving unit for receiving broadcast information related to broadcast signals and broadcast channels, a controller for determining whether each broadcast channel is viewable with reference to broadcasting time slot information of each channel included in the broadcast information, and an output unit for outputting information related to each broadcast channel under control of the controller.

These and other embodiments will also become readily apparent to those skilled in the art from the following detailed description of the embodiments having reference to the attached figures, the invention not being limited to any particular embodiment disclosed.

BRIEF DESCRIPTION OF THE DRAWINGS

The above and other aspects, features, and advantages of the present invention will become more apparent upon consideration of the following description of preferred embodiments, taken in conjunction with the accompanying drawing figures, wherein.

DETAILED DESCRIPTION OF THE PREFERRED EMBODIMENTS

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

Figure 1:
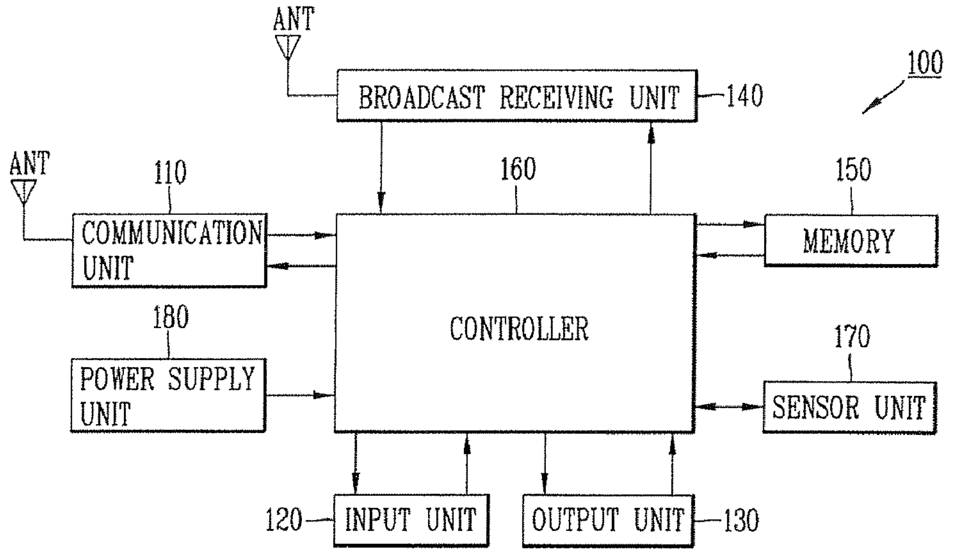
FIG. 1 is a schematic block diagram showing a configuration of a mobile terminal in accordance with the present invention.

FIG. 1 is a schematic block diagram showing the configuration of a mobile terminal 100 in accordance with the present invention. With reference to FIG. 1, the mobile terminal 100 in accordance with the present invention includes a communication unit 110 for transceiving audio and data in a wired or wireless manner with an external terminal or a server. The broadcast receiving unit 140 receives radio, TV, internet broadcasts, or a combination thereof. The output unit 130 outputs one of audio, data, broadcast information, a URL (Uniform Resource Locator), or a combination thereof which are received through the communication unit 110 or the broadcast receiving unit 140. The input unit 120 selects at least one of the information displayed via the output unit 130. The input unit 130 may also receive commands or audio from a user. The memory 150 stores control routines and programs required to control the broadcast information, URL information, or the terminal 100. The memory 150 may also store data that has been input or output. The controller 160 controls each element so as to process the commands, audio, or data which are input through the input unit 120, the communication unit 110, or the broadcast receiving unit 140.

The mobile terminal 100 may further include a sensor unit 170 configured with a plurality of sensors so as to detect an operation state of the mobile terminal. The sensor unit 170 may be provided with an optical sensor (not shown), a vibration sensor (not shown), a location sensor (not shown), or an acceleration sensor (not shown) which are capable of detecting the opening, movement, rotation, or location of the terminal Additionally, the mobile terminal 100 may further include a power supply unit 180 for supplying power applied via a battery or a cable to the terminal 100. The power supply unit 180 detects external power applied via a TA (Travel Adapter) or a USB (Universal Serial Bus) port, and charges the battery (not shown) or powers the terminal 100 by using the external power.

The communication unit 110 connects to an external terminal or a server in a wired or wireless manner for performing audio, video, or data communication, while being controlled by the controller 160. A URL indicating locations of servers may be used for connecting the mobile terminal 100 with the server. The URL indicates the location of files in each server providing a specific service, such as the kind of server which a connection is made, the location of the server, or the location of the file.

Further, information among an Electronic Program Guide (EPG), an Electronic Service Guide (ESG), a broadcast path via which a broadcast signal of each broadcast channel is transmitted, broadcast time information for each channel of which the broadcast signal is transmitted via the broadcast path, or URL information of contents related to the broadcast channel may be transmitted via the communication unit 110.

The input unit 120 may include a microphone (not shown) for receiving a voice call or an audio signal for recognizing speech. The input unit 120 may also generate a signal corresponding to a key input or a touch screen input by a user. The generated signal is sent to the controller 160. Control information related to broadcasting reception or URL information may be input via the input unit 120.

The output unit 130 may include a display (not shown) for displaying information associated with various functions of the terminal 100. The output unit 130 may also include a speaker (not shown) for output of sound generated when receiving an audio signal or various functions of the terminal 100. The display may be implemented as an LCD (Liquid Crystal Display), an OLED (Organic Light Emitting Diode) display, or as a touch screen in which an input function and a display function are combined.

The output unit 130 may display a timetable, a channel list, or a schedule list based on additional information received via the broadcast receiving unit 140 or the communication unit 110. The output unit 130 may also display a web page by connecting to a URL providing content data related to the broadcast channel.

The broadcast receiving unit 140 may receive broadcast signals transmitted via a satellite or other method. The broadcast signals may include broadcast channels transmitting radio, TV, internet broadcasting, or an additional information channel transmitting additional information related to media broadcasting such as an Electronic Service Guide (ESG) or an Electronic Program Guide (EPG).

A greater number of broadcast channels may be provided via the broadcast path after mapping broadcast signals of corresponding channels via the broadcast path according to each broadcast time of the broadcast channels.

The broadcast path may be divided based on frequencies or time slots. The information regarding the broadcast channels mapped on the broadcast path and the broadcast time of each broadcast channel is transmitted via an additional information channel. The controller 160 analyzes the broadcast channels using the broadcast path included in the additional information and the broadcast time information mapped on the broadcast channels, whereby the information of the viewable channels may be displayed according to time.

The channel information may be divided into a general channel and an integrated channel. A general channel maps one broadcast channel onto one broadcast path, whereas an integrated channel maps at least two broadcast channels onto one broadcast path. The general channels and integrated channels are displayed in a channel list or a timetable form. Additionally, the integrated channel includes one broadcast channel receiving broadcast signals according to time and at least one virtual broadcast channel which does not receive the broadcast signals according to time. The virtual broadcast channel may be distinguished by the additional information of the broadcast channel which includes the broadcast path and broadcast time information.

The channel information may include continuously viewable program information or continuously viewable broadcast channel information according to time. The timetable form may display program information according to time of the general channel, a virtual broadcast channel included in the integrated channel, and program information according to broadcast time of the virtual broadcast channel. The general channel may be distinguished from the integrated channel by at least one of an indication area, an indication location, an indication effect, a size, a color, a channel name, or a combination thereof. Additionally, the channels may be visibly distinguished from each other by icons, images, graphics, symbols, characters, or a combination thereof.

As described above, even though a plurality of broadcast channels are mapped onto the same broadcast path, the broadcast channels may not simultaneously use one broadcast path. Therefore, the channels that do not receive the live broadcast signal are referred to as virtual broadcast channels.

The plurality of broadcast channels share the same broadcast path based on different time periods. The broadcast of a first viewed channel may be terminated when the time equals the broadcast time set for a second broadcast channel. For example, if five broadcast channels, such as CH A, CH B, CH C, CH D, and CH E, are mapped onto one broadcast path and a first broadcast channel, such as CH A, is currently broadcast through the broadcast path, the broadcasting of the first broadcast channel may be terminated when the current time equals the time set for a second broadcast channel, such as CH B.

Accordingly, although five broadcast channels actually use the same broadcast path, the user of the mobile terminal 100 cannot continue to receive a broadcast channel when the channel information is changed. Therefore, the user may access a channel list by channel searching and select another broadcast channel which is currently viewable.

The present invention provides a method of informing the user in advance when broadcast channel information which will be changed according to time, or when the contents transmitted from the previous broadcast channel will be received automatically through another path, such as an additional information transmission path or a data transmission path. Furthermore, the user may continuously view all broadcast channels included in the integrated channel.

Hereinafter, the method according to the present invention will be described in detail with reference to the drawings.

The memory 150 may store at least one of the EPG, the ESG, the broadcast path used for the broadcast channels, broadcast time information of each channel using the broadcast path or URL information for each broadcast channel, or contents related to the broadcast channels. The memory 150 may be implemented as an internal or external memory. The memory 150 is not limited to a specific memory type such as a flash memory, a hard disk, a ROM, or a RAM.

If the broadcasting of a broadcast channel is terminated when an assigned broadcast period lapses according to the broadcast time information set for the broadcast channel, the controller 160 automatically connects to the URL related to the terminated broadcast channel such that the user may continue to receive a desired broadcast channel via a data transmission path in a streaming or downloading manner. Additionally, the broadcast channel may be received via the additional information transmission path event though the data transmission efficiency is low.

The URL information may be provided with the broadcast data, the broadcast additional information, or with the data provided together with a real-time broadcast such as subtitle data. The data provided with a broadcast is referred to as PAD (Program Associated Data) or BIFS (Binary Format for Scenes) data.

The additional information may be transmitted via a path for transmitting broadcast signals, an additional information path, or a data path. The additional information transmission path is denoted as a path for transmitting the additional information such as the EPG or the ESG. A specific server may automatically receive the URL information included in the additional information in a predetermined time period or may request the information for the specific mobile terminal 100.

If the user selects a broadcast channel from the indicated channel list, the controller 160 controls the mobile terminal 100 to receive the broadcast signal of the selected broadcast channel via the broadcast receiving unit 140 and outputs audio, video, and data via the output unit 130. When the broadcast signal of the specific broadcast channel cannot be received, the controller 160 performs control operations whereby the mobile terminal 100 automatically connects to the specific URL which it is capable of receiving the contents of the broadcast channel. By controlling the communication unit 110 to connect with the URL, the mobile terminal 100 may continue to receive the contents of the broadcast channel via the network functionality associated with the URL.

When the assigned time slot for the use of a broadcast path lapses according to time allocated for use of the broadcast path, the controller 160 performs control operations whereby the mobile terminal 100 informs the user via a message about broadcast termination at least once before or after the broadcast termination time. The message regarding broadcast termination may be output as a visible or audio indication.

Figure 2:
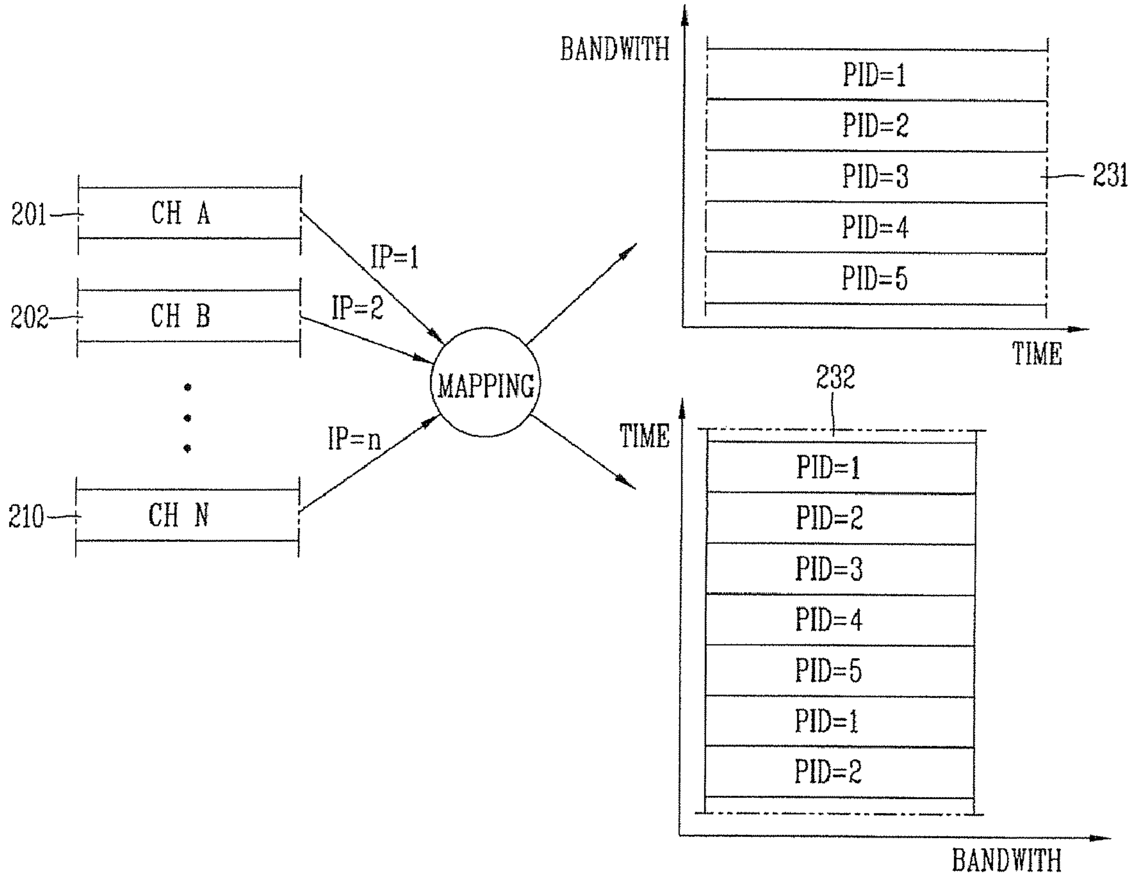
FIG. 2 illustrates a method for providing services of a plurality of broadcast channels via the same broadcast path in accordance with the present invention.

FIG. 2 illustrates a method for providing services of a plurality of broadcast channels via the same broadcast path in accordance with an embodiment of the present invention.

As shown in FIG. 2, each broadcast channel 201-210 with a different set broadcasting time is mapped on the broadcast path by a service provider. A broadcast signal of the channel corresponding to the set broadcast time is transmitted via the broadcast path. Information, IP=1-IP=n, regarding each broadcast channel and broadcast time information of each broadcast channel is transmitted via an additional information transmission path. Additionally, information, PID=1~PID=n, regarding each broadcast path to which the broadcast channels are mapped is transmitted via an additional information transmission path. The broadcast path may be a broadcast band 231 divided by frequencies or a broadcast band 232 divided by time slots.

For example, if a provider provides twenty broadcast channels, IP=1-IP=20, and five broadcast paths, PID=1-PID=5, the broadcast paths are capable of simultaneously providing services for five broadcast channels. The broadcast channels are divided into four groups and each group may be mapped onto each broadcast path. For instance, four broadcast channels, IP=1-IP=4, are mapped onto a first broadcast path, PID=1, and four other broadcast channels, IP=5-IP=8, are mapped onto a second broadcast path, PID=2. Alternatively, four broadcast channels may be mapped on three broadcast paths, PID=3, PID=4, PID=5. The number of broadcast channels mapped onto each broadcast path need not to be same.

Additional information regarding each broadcast channel is transmitted via an additional information broadcast path. The additional information includes information regarding the broadcast path via which each broadcast channel is transmitted, the broadcasting time slot information of each channel, URL information associated with each broadcast channel, or a combination thereof. The URL information may also be associated to the specific content broadcast on the broadcast channels.

Based on the received additional information, the controller 160 may identify the broadcast channels mapped on the broadcast path according to time and display the channel information in at least one format, such as a timetable, a channel list, or a schedule list. For example, all broadcast channels mapped on the broadcast path may be displayed on the channel list regardless of whether or not the broadcast signal is currently being transmitted. Additionally, broadcast channels mapped on the same broadcast path may be displayed as integrated channels after the broadcast channels are grouped.

The channel information may be distinguished into a general channel, wherein one broadcast channel is mapped to one broadcast path, and an integrated channel, wherein at least two broadcast channels are mapped on one broadcast path. The integrated channel includes at least one virtual broadcast channel not carrying the broadcast signal according to time. A plurality of virtual channels may be continuously viewed via the integrated channel.

Program information according to time may be included in the timetable. Additionally, the timetable may also include program information according to the virtual broadcast channels included in the integrated channel and the broadcasting time of the virtual broadcast channels. With respect to the general channel and the integrated channel, one of the indication areas, the indication locations, the sizes, the colors, the channel names, or a combination thereof may be distinguished. Furthermore, the channels may be distinguished from each other by the indicators such as icons, images, graphics, symbols, characters, or a combination thereof.

Figure 3A:
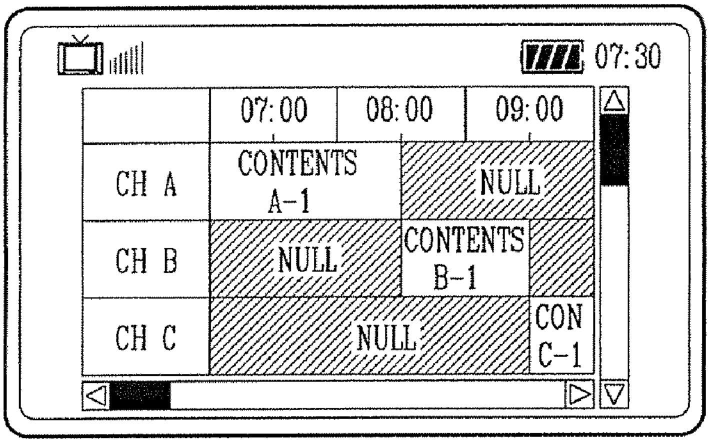
FIG. 3A illustrates displaying of a timetable of broadcast channels on the display screen of a mobile terminal in accordance with the present invention.
Figure 3B:
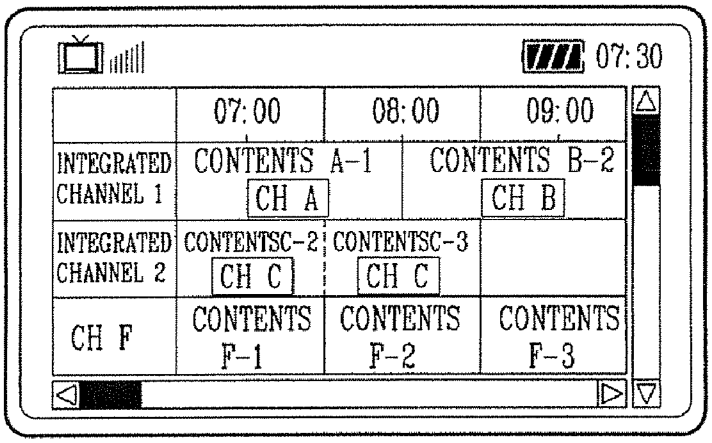
FIG. 3B illustrates displaying of a timetable of broadcast channels on the display screen of a mobile terminal in accordance with the present invention.

FIGS. 3A and 3B illustrate an embodiment of the timetable. FIG. 3A illustrates a screen display of a timetable indicating the viewable time of each broadcast channel and the programs being broadcasted at that time with reference to broadcasting time slot information of each broadcast channel included in the additional information. FIG. 3B illustrates a screen display of a timetable indicated in the integrated channel format grouping a plurality of the broadcast channels mapped onto the same broadcast path.

Each broadcast channel included in the integrated channel is sequentially indicated according to its broadcasting time. Only one broadcast channel may be broadcast during a specific time period. Remaining broadcast channels are referred to as virtual broadcast channels.

For example, as shown in FIGS. 3A and 3B, a plurality of broadcast channels are mapped onto the same broadcast path. However, only one broadcast channel may be broadcast during a specific time period. As shown in FIGS. 3A and 3B, the current time is 07:30. Therefore, the CONTENTS A-1 may be received in realtime via the realtime-broadcasted channel "CH A" for which the broadcasting time is set as "07:00~08:30".

As shown in FIG. 3B, the integrated channels are displayed with names 'integrated channel 1' and 'integrated channel 2', and the general channel is displayed with the name 'CH F'. However, each name can have an additional explanation that can distinguish the general channels and the integrated channels, or may be changed into other names. Also, the channel information may be distinguishably displayed by background colors, foreground colors, indication areas, indication locations, indication effects or other visible indicators as described above.

As shown in FIGS. 3A and 3B, the channel information is indicated in the form of a timetable having a long length in the horizontal direction (row-wise). However, the channel information may be configured as a timetable having a long length in the vertical direction (column-wise). Also, the channel information that is not displayed on a single screen can be successively indicated in a page flipping manner or a scrolling manner by inputting of a specific key stroke or other command input.

Figure 4:
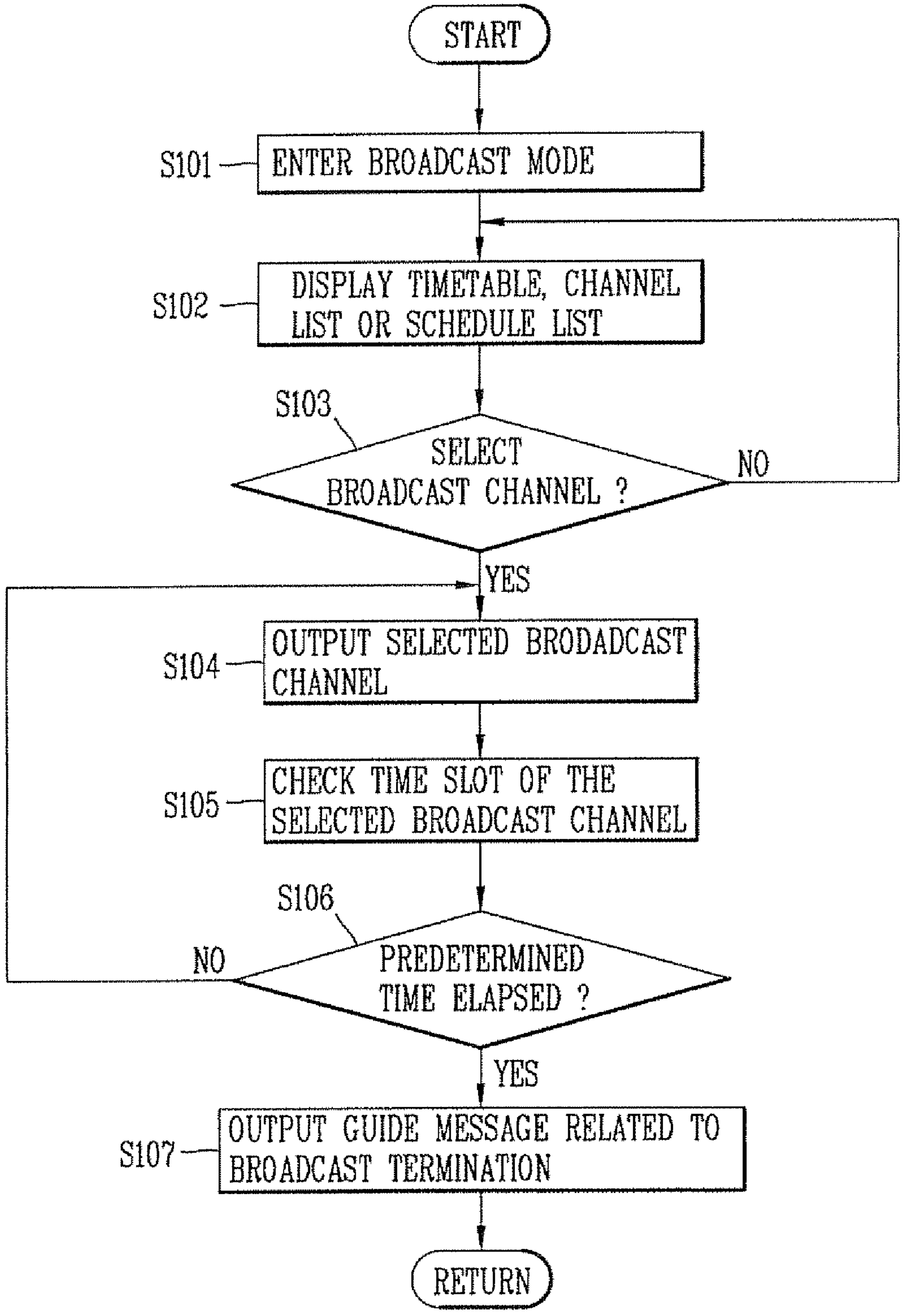
FIG. 4 is a flow chart of a method for terminating reception of a specific broadcast channel in the mobile terminal in accordance with another embodiment of the present invention.

FIG. 4 is a flow chart showing an operation in the mobile terminal 100 in accordance with the present invention when broadcasting of a specific broadcast channel is stopped as the broadcasting time slot set for the specific broadcast channel lapses.

In accordance with the present invention, when one broadcast path is shared by a plurality of broadcast channels according to time periods or time slots, a user may be informed of broadcasting time slot information of the broadcast channels.

The broadcast path and the broadcast time slot information of broadcast channels mapped on one broadcast path are stored in the memory 150 of the mobile terminal 100 in accordance with the present invention.

As shown in FIG. 4, the mobile terminal 100 enters a broadcast mode as selected by the user (S101). The broadcast mode denotes a mode for receiving and outputting media contents of at least one broadcast which is received by the mobile terminal 100. The broadcast mode is distinguished from an Internet mode for connection to a specific URL via an Internet browser.

In the broadcast mode, a timetable, a channel list, or a schedule list is displayed (S102) when the user inputs a specific key input or menu selection. Accordingly the user may select a desired broadcast channel or program by referring to the display information. When the user selects a specific broadcast channel or program from the channel list (S103), the controller 160 performs control operations whereby the mobile terminal 100 receives broadcast signals of the selected channel via the broadcast receiving unit 140 and outputs video or audio of the received broadcast through the output unit 130 (S104).

The controller 160 checks the broadcast time slot information of the selected broadcast channel (S105). The broadcast time slot information denotes the time remaining until the selected broadcast channel is changed to carry another broadcast channel. The controller 160 continuously checks the time to determine when the channel should be changed.

The controller 160 determines if there is any remaining broadcasting time of the selected broadcast channel (S106). A guide message regarding the broadcasting stoppage of the corresponding broadcast channel is output (S107) when a predetermined time lapses during the remaining broadcasting time. The guide message may be output as a visible indicator or as audio message. The output time, output times, or output location of the guide message may be changed.

Figure 5A:
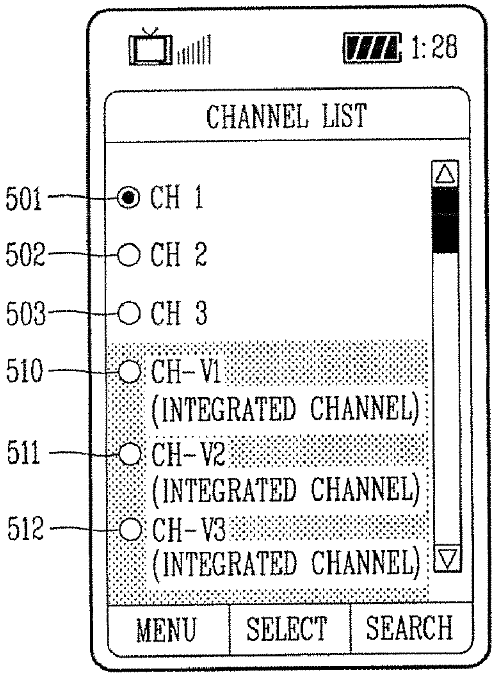
FIGS. 5A through 5D illustrate an example of sequential screen displays of a mobile terminal showing a method for indicating channel information in accordance with the present invention.

The broadcast channels may be aligned in a user-desired manner. For example, as shown in FIG. 5A, the broadcast channels may be identified as general channels 501, 502 and 503 or integrated channels 510, 511 and 512. A general channel refers to a single broadcast channel mapped on a single broadcast path and an integrated channel refers to one of a plurality of channels mapped on a single broadcast path. An integrated channel includes at least one virtual channel that cannot be viewed in realtime according to time.

Figure 5B:
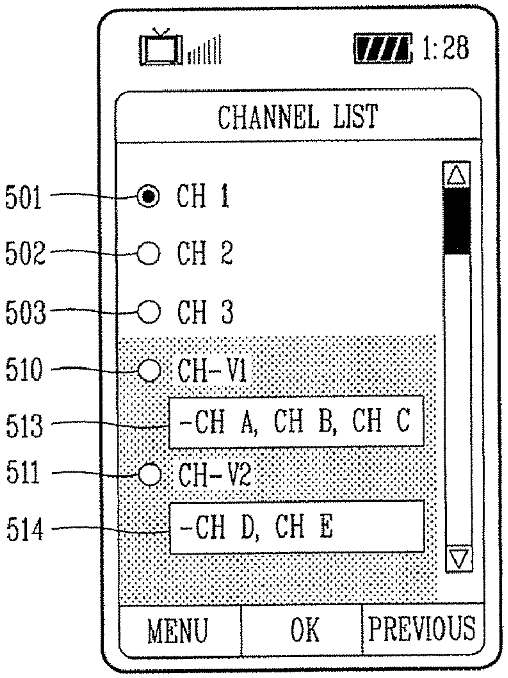

As shown in FIG. 5B the integrated channel display may indicate information of all virtual channels included in the integrated channel.

Figure 5C:
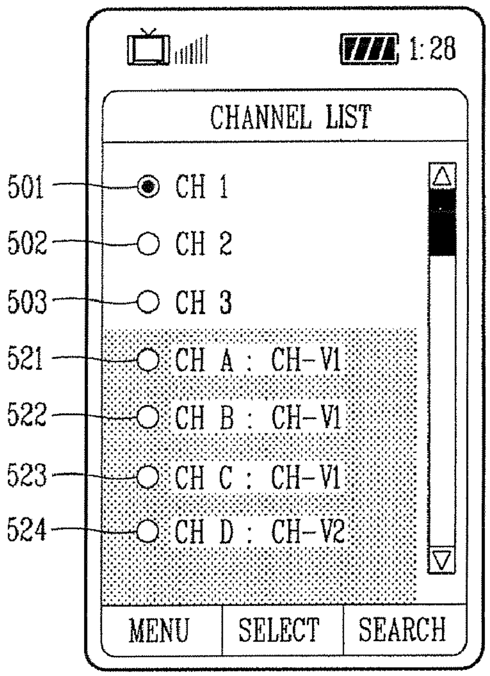
Figure 5D:
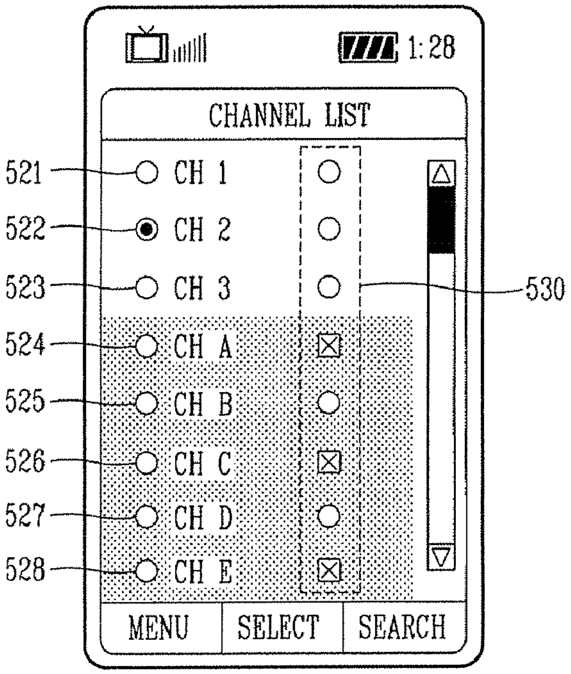

As shown in FIG. 5C, the broadcast channel information may be identified as general channels 501, 502 and 503 and virtual channels 521, 522, 523 and 524. Additional virtual channel information, such as CH-V1, CH-V2, may be selectively included in the integrated channel display.

As shown in 5D, the virtual channels, which may be viewed in realtime, are distinguished from the virtual channels, which may not be viewed in realtime, with regard to the current time. For example, the available realtime channels 521, 522, 523, 525 and 527 are identified with a circle while the unavailable realtime channels 524, 526 and 528 are identified with an X.

In order to distinguish the general channels, the integrated channels or the virtual channels as channels that can be viewed in realtime and channels that cannot be viewed in realtime, one or more of indication areas, indication locations, indication effects, sizes, background colors, foreground colors or channel names of each channel information may be identified. Additionally, the channels may be distinguished by an indicator 530 including icons, images, graphics, symbols, characters, or a combination thereof.

Figure 6A:
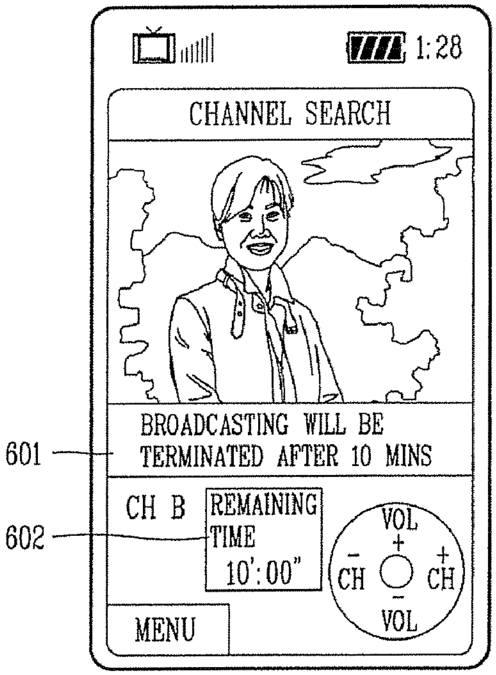
FIG. 6A illustrates a screen display of a mobile terminal showing a method for outputting a message regarding the termination of a broadcast channel in accordance with one embodiment of the present invention.

As shown in FIG. 6A if two broadcast channels are mapped onto the same broadcast path and the currently selected broadcast channel is to be changed to another one broadcast channel, a message 601 related to the broadcasting termination may be output. Additionally, the mobile terminal 100 may display the remaining broadcasting time slot information 602 before the broadcast path is changed to another broadcast channel.

Figure 6B:
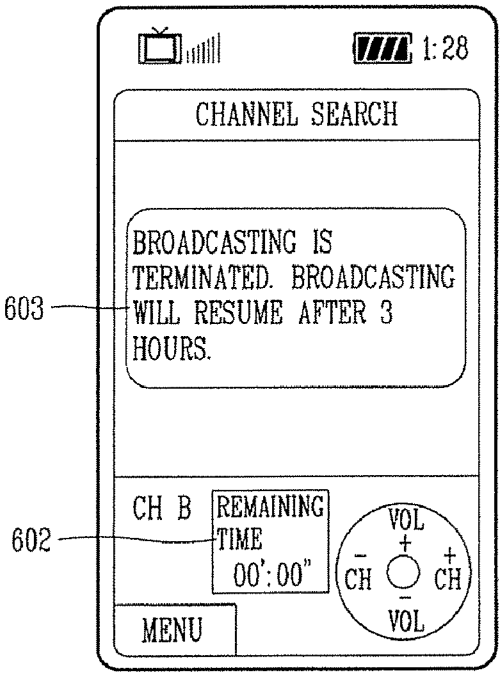
FIG. 6B illustrates a screen display of a mobile terminal showing a method for outputting a message regarding the termination of a broadcast channel in accordance with another embodiment of the present invention.

As shown in FIG. 6B, a guide message 603 related to the broadcast termination may be output after termination of the broadcast. The message may include information regarding the time that broadcast of a currently selected broadcast channel was terminated, the time that the currently selected broadcast channel will restart broadcasting, the reason that broadcasting of the currently selected broadcast channel was stopped, a method for continuously receiving the currently selected broadcast channel, information regarding another broadcast channel that may be received instead of the terminated broadcast channel, or a combination thereof.

When broadcasting of the currently selected broadcast channel is terminated, the mobile terminal 100 enables continuous reception of the broadcasting contents which were previously received via the terminated broadcast channel. The method for continuous reception will be described in detail with reference to FIGS. 7 and 8.

Figure 7:
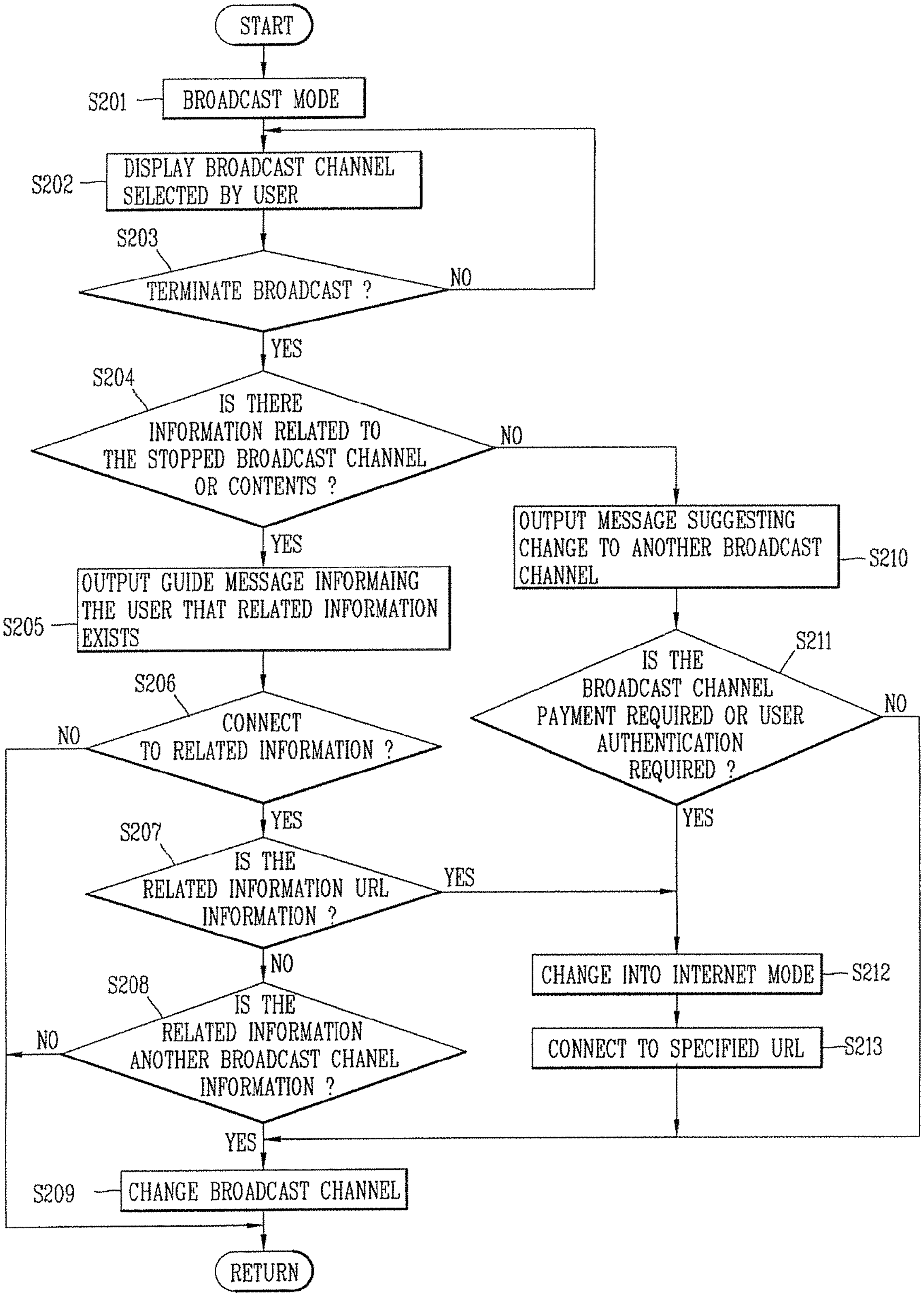
FIG. 7 is a flow chart of a method for receiving content related to a broadcast channel when the broadcast of a specific broadcast channel is terminated in accordance with the present invention.

FIG. 7 is a flow chart of a method for continuous reception in accordance with the present invention.

The mobile terminal 100 displays a specific broadcast channel selected by the user (S202) in the broadcast mode (S201). When the specific broadcast channel is terminated (S203) as the broadcast time for that specific broadcast channel lapses, a guide message related to the broadcast termination is read from the memory and output at a time which may be preset.

Figure 8A:
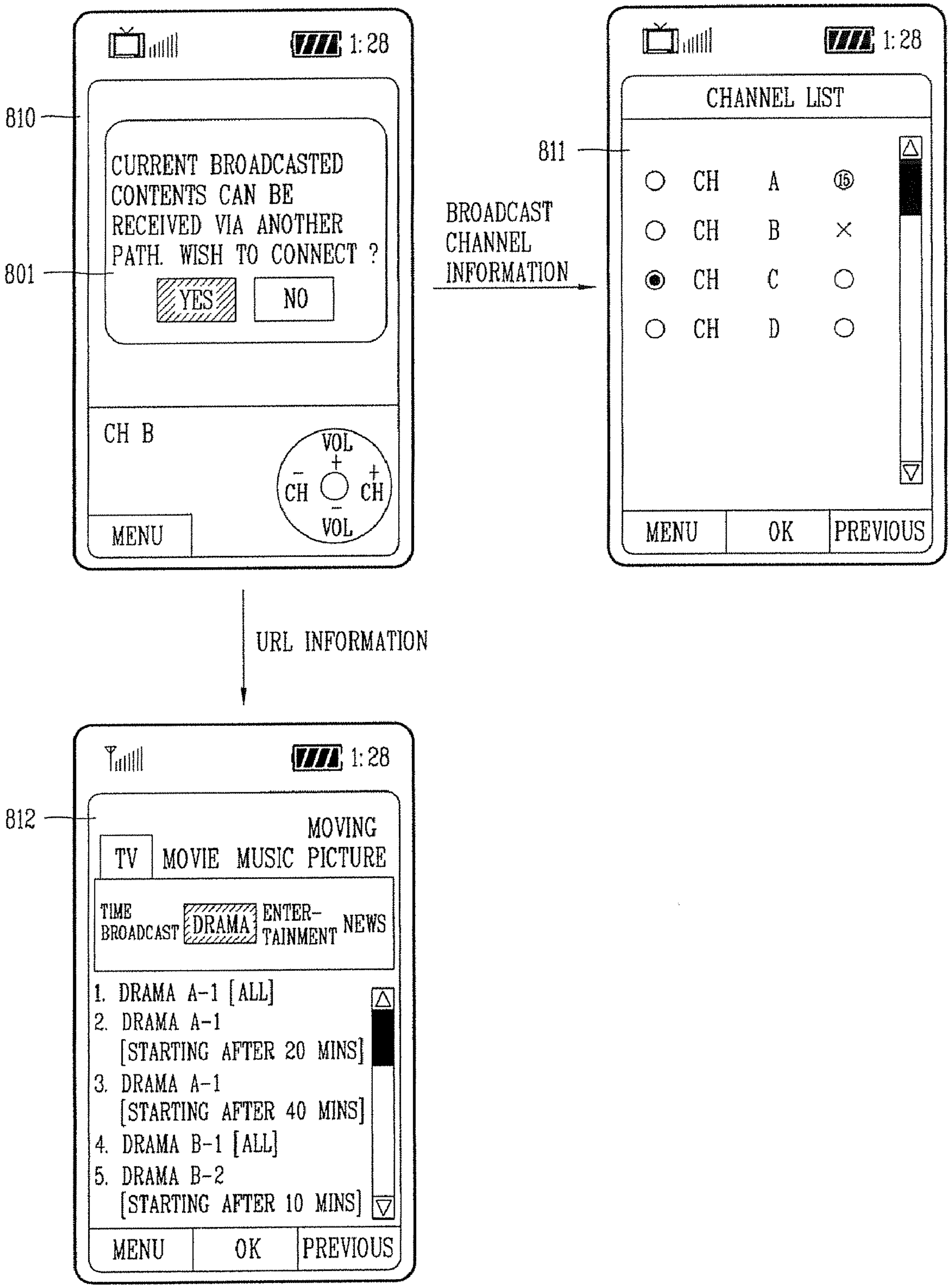
FIG. 8A illustrates screen displays of a mobile terminal outputting of a guide message for connection of contents related to a broadcast-stopped channel in accordance with the present invention.

The controller 160 determines if URL information for receiving the broadcast channel or the contents broadcasted on the stopped broadcast channel is stored in the memory (S204). As shown in FIG. 8A, a message 801 regarding a method for receiving the broadcast or contents information broadcast on the stopped broadcast channel and asking whether or not the user wishes to connect to the information are output (S205). In an alternate embodiment, the mobile terminal 100 may automatically connect to the information resource without user interaction.

The information related to the broadcast or the broadcast contents may be URL information for accessing the broadcast channel or the contents information broadcast on the broadcast channel, or information of another broadcast channel broadcasting the same contents.

When the user responds to the connection message or the mobile terminal 100 is set to automatically connect to the information (S206), if the related broadcast information includes URL information (S207), the controller 160 changes the broadcast mode to an Internet mode (S212), and connects to the specified URL 812 (S213).

The URL includes a URL of a web page capable of permitting the mobile terminal user to view contents related to broadcasting, or a URL of a networked resource, such as a Video-On-Demand server, capable of enabling receipt of the contents of the transmission-stopped broadcast channel in a streaming or downloading manner. If the information is information of another broadcast channel broadcasting the same contents (S208), the currently selected broadcast channel is automatically changed to the corresponding other broadcast channel (S209).

When two or more other broadcast channels are available, after displaying a channel list 811, the user may select one broadcast channel to view. The broadcast contents may also be stored by using a PVR (Personal Video Recorder) facility provided in the mobile terminal.

Figure 8B:
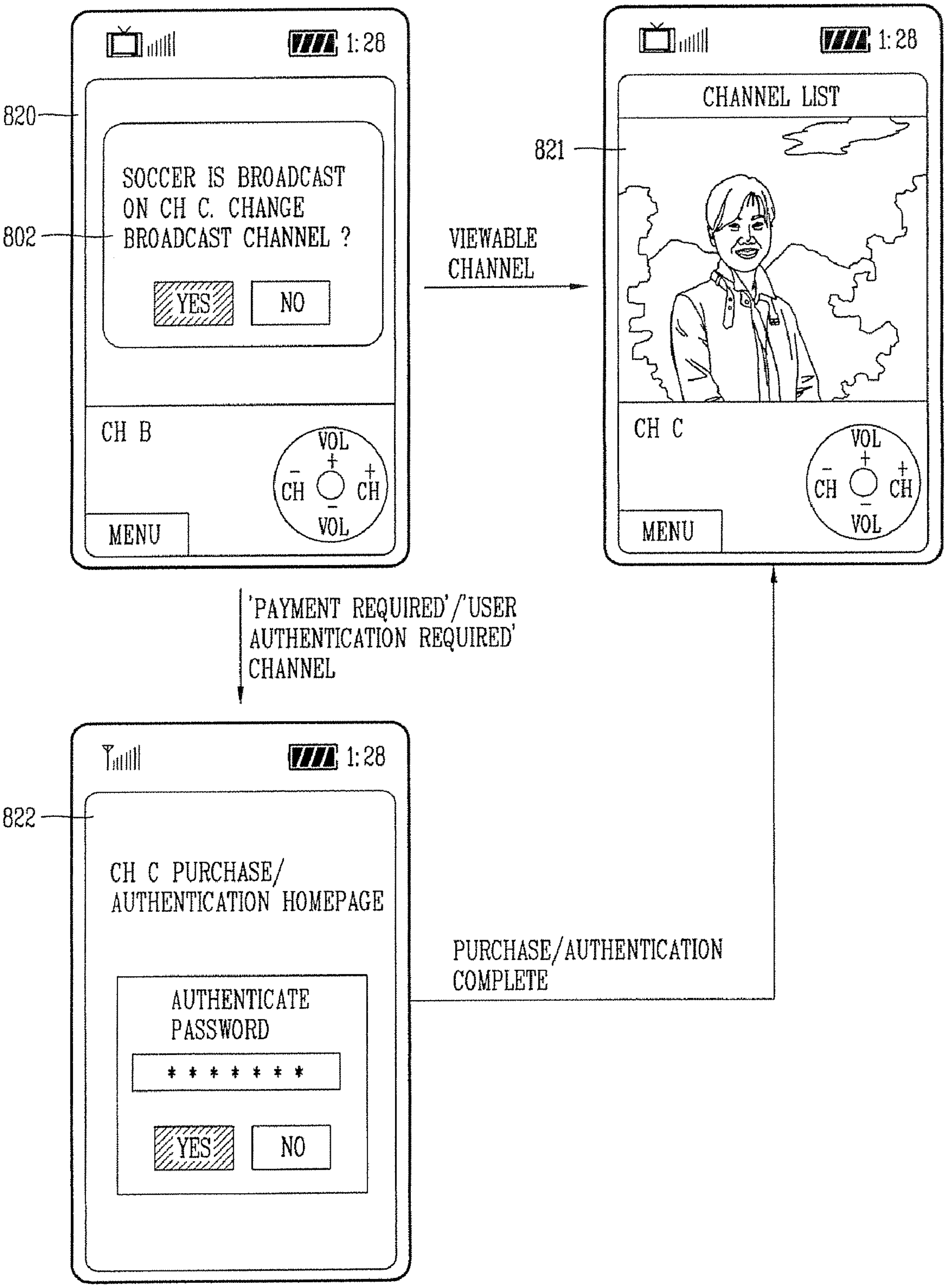
FIG. 8B illustrates screen displays of a mobile terminal showing a method for receiving another broadcast channel when broadcasting of a broadcast channel is stopped in accordance with the present invention.

Additionally, as shown in FIG. 8B, the mobile terminal 100 may display a message 802 that suggests reception of a different broadcast channel (S210) when broadcasting of the specific broadcast channel is terminated as described above.

For example, broadcast channels broadcasting similar contents, such as movies, news, dramas, sports, or music may be mapped onto the same broadcast path and grouped by a provider. Each broadcast channel may have the same reception authority or different authorities, such as payment required, no payment required, or user authentication required.

Accordingly, the mobile terminal 100 may determine characteristics of each broadcast channel via the additional information, another broadcast channel broadcasting contents related to the current broadcast channel, or the message asking whether to receive a broadcast channel set by the user may be displayed. The broadcast channel may be automatically changed according to the environment setup in the mobile terminal 100. By the message suggesting reception of another broadcast channel or the automatic change of the broadcast channel, the present method is capable of freeing the user from searching the channel list which otherwise must necessarily be performed to change the broadcast channel.

If the broadcast channel suggested by the message is a ‘payment required’ broadcast channel or a ‘user authentication required’ broadcast channel (S211), the mobile terminal 100 may automatically connect to a specific URL 822 for purchasing or authenticating the corresponding broadcast channel (S213) after displaying a related message to the user, and after the user has responded affirmatively to the message. When the purchase or user authentication of the broadcast channel is completed, the currently selected broadcast channel is changed to the corresponding broadcast channel 821 to receive broadcast content of the broadcast channel (S209).

As shown in FIG. 8A, the downloaded contents may be immediately played after downloading the contents of the broadcast channel by connecting to a specific URL. The downloading process may be performed as a background process during the broadcasting.

The present invention enables the number of broadcast channels that is provided to be greater than the number of broadcast channels. Furthermore, the present invention enables the reception of a plurality of broadcast channels when a plurality of broadcast channels having different contents and viewing authorities are broadcast via the same broadcast path. Additionally, the present invention informs a user in advance of a broadcast termination when broadcasting of a broadcast channel is to be stopped when the associated time slot lapses. Finally, the present invention enables reception of a program of a broadcast channel via another path even though broadcasting of the broadcast channel is terminated.

The foregoing embodiments and advantages are merely exemplary and are not to be construed as limiting the present invention. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present inventive features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method for displaying broadcast channel information in a mobile terminal, the method comprising:

entering a broadcast reception mode;

displaying, on a display unit, a channel list of channels available for reception, the channel list including channel information indicating whether each channel of the channel list is a general channel comprising a first broadcast channel associated with a first broadcast path or an integrated channel comprising a second broadcast channel and a virtual broadcast channel associated with a second broadcast path;

selecting, from the channel list, an integrated channel;

receiving a first broadcast signal of the selected integrated channel via the second broadcast path in response to selecting the integrated channel;

displaying, on the display unit, first broadcast content of the first broadcast signal received via the second broadcast path; and displaying, on the display unit prior to displaying second broadcast content of a second broadcast signal associated with the selected integrated channel, a menu for selecting to receive the first broadcast signal via a third broadcast path when the receiving of the first broadcast signal via the second broadcast path has been terminated;

selecting, via the menu, to receive the first broadcast signal via the third broadcast path;

receiving the first broadcast signal via the third broadcast path in response to selecting to receive the first broadcast signal via the third broadcast path; and displaying, on the display unit, the first broadcast content of the first broadcast signal received via the third broadcast path, wherein the second broadcast channel receives a specific broadcast signal at a specific time and the virtual broadcast channel does not receive the specific broadcast signal at the specific time.

2. The method of claim 1, further comprising:

dividing the first rebroadcast path and the second rebroadcast path by frequencies or time slots.

3. The method of claim 1, wherein the virtual broadcast channel includes a broadcast time slot.

4. The method of claim 1, further comprising:

displaying, on the display unit, the channel list in a timetable format according to a broadcast time slot, wherein the channel information further indicates the broadcast time slot for each channel of the channel list.

5. The method of claim 1, further comprising:

distinguishing, in the channel list, the general channel is distinguished from the virtual channel by at least an indication area, an indication effect, a size, a color, a symbol, or a channel name.

6. The method of claim 1, wherein the menu further comprises at least:

a time when the receiving of the first broadcast signal via the second broadcast path was terminated, a time that the first broadcast signal will restart broadcasting via the second broadcast path, or a reason for the termination of the receiving of the first broadcast signal via the second broadcast path.

7. A mobile terminal, comprising:

a receiving unit for receiving a first broadcast signal for a general channel comprising a first broadcast channel that is associated with a first broadcast path and a second broadcast signal for an integrated channel comprising at least a second broadcast channel and a virtual broadcast channel that are associated with a second broadcast path;

a display unit for displaying a channel list comprising the general channel and the integrated channel and for displaying broadcast content;

an input unit for selecting to display broadcast content of the general channel or the integrated channel; and a controller for:

controlling the display unit to display first broadcast content of the second broadcast signal when the integrated channel is selected;

controlling the display unit to display, prior to displaying second broadcast content of a third broadcast signal associated with the selected integrated channel, a menu for selecting to receive the second broadcast signal via a third broadcast path when the receiving of the second broadcast signal via the second broadcast path has been terminated; and controlling the display unit to display the first broadcast content in response to an input on the menu to receive the second broadcast signal via the third broadcast path, wherein the second broadcast channel receives a specific broadcast signal at a specific time and the virtual broadcast channel does not receive the specific broadcast signal at the specific time.

8. The mobile terminal of claim 7, wherein the menu further includes at least:

a time when the receiving of the second broadcast signal via the second broadcast path was terminated, a time that the second broadcast signal will restart broadcasting via the second broadcast path, or a reason for the termination of the receiving of the second broadcast signal via the second broadcast path.

9. The mobile terminal of claim 7, further comprising a memory for storing broadcast information received via the receiving unit.

10. The mobile terminal of claim 7, wherein the controller is further for:

grouping at least two broadcast channels of the integrated channel; and controlling the display unit to display the grouped at least two broadcast channels.

11. The mobile terminal of claim 10, wherein the controller is further for:

controlling the display unit to display information regarding each of the grouped at least two broadcast channels.

12. The mobile terminal of claim 7, wherein the receiving of the second broadcast signal via the second broadcast path is terminated when a broadcast time slot of the second broadcast signal lapses.

* * * * *